US007269860B2

(12) United States Patent
Dennis et al.

(10) Patent No.: US 7,269,860 B2
(45) Date of Patent: Sep. 18, 2007

(54) MOISTURE-BARRIERED, BODY-CONTACT PROTECTIVE INTERFACE STRUCTURE

(75) Inventors: Michael R. Dennis, Scappoose, OR (US); Michael W. Tucker, Beaverton, OR (US); Gerhard Paasche, Scappoose, OR (US)

(73) Assignee: MJD Innovation, LLC, Scappoose, OR (US)

( * ) Notice: Subject to any disclaimer, the term of this patent is extended or adjusted under 35 U.S.C. 154(b) by 0 days.

(21) Appl. No.: 11/257,618

(22) Filed: Oct. 25, 2005

(65) Prior Publication Data
US 2006/0253964 A1    Nov. 16, 2006

Related U.S. Application Data

(63) Continuation of application No. 10/156,074, filed on May 27, 2002, which is a continuation of application No. 09/942,987, filed on Aug. 29, 2001, now Pat. No. 6,467,099, which is a continuation of application No. 09/390,518, filed on Sep. 3, 1999, now abandoned.

(60) Provisional application No. 60/099,208, filed on Sep. 3, 1998.

(51) Int. Cl.
*A42B 3/12* (2006.01)
(52) U.S. Cl. ........................................................ 2/414
(58) Field of Classification Search .................... 2/414, 2/455, 456, 464, 463, 22, 24, 459, 16, 411, 2/412, 425, 181.2, 410, 466; 428/318.8, 428/423.1, 304.4; 36/28, 29, 36; 604/304, 604/358; 602/41, 56
See application file for complete search history.

(56) References Cited

U.S. PATENT DOCUMENTS

| 3,366,971 | A | * | 2/1968 | Scherz ............................ 2/412 |
| 4,235,228 | A | * | 11/1980 | Gaylord et al. ................. 602/8 |
| 4,807,303 | A | * | 2/1989 | Mann et al. ...................... 2/69 |
| 5,102,711 | A | * | 4/1992 | Keller et al. ................... 428/71 |
| 5,277,954 | A | * | 1/1994 | Carpenter et al. ............. 428/71 |
| 5,527,833 | A | | 6/1996 | Kuczynski et al. |
| 5,741,568 | A | | 4/1998 | Rudy |
| 5,913,412 | A | * | 6/1999 | Huber et al. ................... 2/414 |
| 5,930,840 | A | * | 8/1999 | Arai ............................... 2/411 |
| 6,467,099 | B2 | * | 10/2002 | Dennis et al. ................. 2/455 |
| 2006/0179555 | A1 | * | 8/2006 | Stinga et al. ................... 2/455 |

FOREIGN PATENT DOCUMENTS

DE          3937648 C1   *   5/1991
EP           397998 A1   *  11/1990

* cited by examiner

*Primary Examiner*—Danny Worrell
(74) *Attorney, Agent, or Firm*—Jon M. Dickinson, PC; Robert D. Varitz, PC

(57) ABSTRACT

A moisture-barriered, body-contact protective interface structure including a core, viscoelastic, acceleration-rate-sensitive cushioning structure, and a moisture-barriering container surrounding the cushioning structure, with the container being operable to block the flow of moisture while accommodating gas breathability for the cushioning structure.

3 Claims, 1 Drawing Sheet

MOISTURE-BARRIERED, BODY-CONTACT PROTECTIVE INTERFACE STRUCTURE

CROSS REFERENCES TO RELATED APPLICATIONS

This application is a continuation from U.S. patent application Ser. No. 10/156,074, filed May 27, 2002, for "Body-Contact Protective Interface Structure and Method", which is a continuation from U.S. patent application Ser. No. 09/942,987, filed Aug. 29, 2001, now U.S. Pat. No. 6,467,099 B2, granted Oct. 22, 2002, entitled "Body-Contact Cushioning Interface Structure and Method", which is a continuation from U.S. patent application Ser. No. 09/390,518, filed Sep. 3, 1999, entitled "Body-Contact Cushioning Interface Structure", now abandoned, which application claims priority to U.S. Provisional Application Ser. No. 60/099,208, filed Sep. 3, 1998, entitled "Body Contact System and Structure for Wearable Garments, such as a Helmet." The foregoing patents and applications are incorporated herein by reference.

BACKGROUND AND SUMMARY OF THE INVENTION

The present invention relates to a human-body-contact, protective and cushioning interface structure. More particularly, it relates to such a structure which is designed to be interposed the body and some external structure which is worn on or attached to the body, and through which various kinds of loads (such as shock, general wearing-pressure related, and gravitational) may be applied to the body. While there are many applications wherein the structure of the present invention can offer distinct advantages, one preferred embodiment of the invention is described herein specifically (for illustration purposes) in the setting of a helmet, such as a military helmet, with respect to which the invention has been found to furnish particular utility.

Describing the invention first with reference to the conventional "military helmet" environment, this environment is very demonstrative of the issues that are successfully addressed by the present invention. For example, the current U.S.-issue infantry helmet utilizes an internal webbing system combined with a removable leather liner to suspend the helmet on the wearers head. Airspace between the webbing and the shell of the helmet greatly contributes to the ballistic and cooling capabilities of the helmet, but the webbing system has proven consistently to be quite uncomfortable, and thus to be the source of many complaints from users.

Generally speaking, such discomfort comes about principally because of localized capillary circulation loss caused by localized high-pressure points that exist in the contact interface between the helmet and the head. These pressure points come about typically because of poor conformation (uneven pressure distribution) of the usual web-borne head-contacting structure and the shape of the head. Such pressure points generate the complained-of discomfort and pain by creating localized low-blood-concentration ischemia regions in the head.

The structure of the present invention offers improvements in many areas of body-protective interest. This structure, in one preferred form of the invention, features a novel, multi-layered, pad-like cushioning structure which includes different layer components that individually address (1) conformance-comfort and ballistic behaviors, (2) moisture-wicking and cooling behaviors, and (3) moisture (water)-barriering behavior that both guards and enhances the performances associated with matters (1) and (2).

The structure of the invention, in relation to the matters of ballistic behavior and comfort, effectively minimizes, substantially to beyond notice, localized high-pressure contact conditions which are the principal creators of discomfort. In the bargain, so-to-speak, of dealing with this issue, the same structural features which vanquish discomfort promote significantly improved ballistic response. Notably, the structure's improved ballistic behavior remains uncompromised even in the very challenging circumstances of water immersion which can, if not carefully prevented from introducing any water into the cushioning core material, appreciably disable the shock-handling capabilities of that material.

Other features of the invention successfully improve the state of the art with respect (a) to minimizing the build-up of heat, (b) to maximizing the dispelling of perspiration, and (c) to enhancing the action of evaporative cooling.

According to one preferred embodiment of the invention, our proposed new structure includes (a) an outer body-contacting structure which is formed of a suitable moisture-wicking structure, (b) an anatomically conforming, acceleration-rate-sensitive (preferably viscoelastic), cushion-like core structure which is disposed adjacent the moisture-wicking structure, and (c) a moisture (water)-barriering, yet core-breathability-accommodating, barrier structure forming a substantially complete jacketing enclosure, or container, around the core structure.

The cushion-like, rate-sensitive core structure can be, selectively, either of a single-component or of a plural-component (plural sublayers) nature, and in the setting of a military helmet, preferably takes the form of two, individual, viscoelastic sublayers which have two different durometers. In this helmet setting, and during use by a wearer, the lower-durometer sublayer is employed closer to the head, and the higher-durometer sublayer is on the opposite side of the lower-durometer sublayer relative to the head, and is interposed the lower-durometer sublayer and the outer external structure which is still on the inside of a helmet. Within, and throughout the full, three-dimensional boundaries of each rate-sensitive, viscoelastic layer, the layer material therein is unfettered in its uniform, omnidirectional performance in response to introduced impact/shock loads. No other structure extends as a non-"homogeneous" anomaly through and in this region, which other structure would alter such uniform, all-over, load-response behavior.

In this newly proposed layered structure, the body-contacting (head-contacting in the case of a helmet) moisture-wicking layer effectively draws moisture away from the body. It accomplishes this, in the helmet environment, in a way which is experienced as being superior to the related activity of a conventional helmet support system.

The barrier layer forms a substantially uninterrupted continuum—a continuum which possesses no through-flow passage capable of permitting the through-flow of water to the core structure—enclosing the inside rate-sensitive core-structure material, and thus defines a limiting boundary for the migration of wicked moisture (water), preventing it from wetting the rate-sensitive material, and encouraging, at its outer surface, rapid evaporation and attendant cooling. In addition, the barrier layer is designed to accommodate substantially uncompromised cushioning behavior in the adjacent rate-sensitive, viscoelastic structure. This barrier layer, as above mentioned, may take the form of a suitable enveloping enclosure, or container, which may, as in the preferred embodiment of the invention specifically illustrated herein, be structured as a sprayed-on coating.

The cushioning, rate-sensitive, viscoelastic layer structure (two sublayers in the preferred helmet embodiment described herein) furnishes a unique and very effective response both to static and to dynamic (shock/impact/ballistic) loads. This material is temperature and pressure sensitive, and tends to creep (flow laterally) away from hot spots and from localized high-pressure spots. It thus tends to evenize the distributed static (wearing) load, and thus to eliminate, substantially, localized capillary circulation loss, and hence, localized ischemia regions. This latter-mentioned feature can be especially significant also in tight bandaging situations.

Additionally, and very significantly with regard to shock protection, the cushioning layer in the structure of this invention responds (rate-resistantly) to shock-produced, rapid acceleration with a resistance to deformation that generally rises in a somewhat direct relationship to the level of acceleration. This kind of acceleration-rate sensitivity is somewhat analogous to the phenomenon known in the world of fluid mechanics as shear-resistant fluid dilatancy. This behavior causes a shock load to be transmitted to and borne by the body over a relatively wide surface area, and thus generally reduces the likelihood of serious injury. The rate-sensitive core material proposed by the structure of this invention also responds to (and following) an impact event by recovering slowly to an undeformed condition—thus avoiding any dangerous "rebound" activity. The important and special rate-resistant, and slow "recovery", response of this material requires the maintenance, immediately adjacent it, of adequate gas-breathability during onset and recovery from deformation, in an environment which also simultaneously guards the core material against the infusion of water, or other "solid-like" moisture. Moisture infusion would dramatically and negatively affect ballistic-response cushioning behavior. The barrier layer, either as an enclosure with some space existing between it and the core structure, or as a sprayed-on layer which possesses the quality of gas breathability, accomplishes these functions.

The layer structure of this invention is easily rendered in a variety of specific configurations, and thus is readily usable in a host of different settings. It is relatively easy and inexpensive to manufacture, and it can be introduced very conveniently in a wide range of "retrofit" situations. The specific layer organization of the invention which is chosen for different selected applications is itself an accommodating variable—a variable which enhances the invention's versatility. For example: overall structure thickness can be different for different circumstances. A single, or more than two, rate-sensitive sublayer(s) can be employed. Within a relatively wide range, a different specific durometer value (or values) for the rate-sensitive sublayer(s) can be chosen. The moisture-wicking layer can be distributed in different ways in the structure to suit different use environments, and can be omitted if desired for use of the invention in certain applications. The moisture (water)-blocking barrier layer can have different selected characteristics to suit different applications. Importantly, this layer is chosen to be such, that in any situation, such as a water-immersion event, which exposes the proposed new layer structure to significant wetting, substantially no water can penetrate the barrier layer to degrade the shock-managing performance of the rate-sensitive layer material contained inside.

Accordingly, variations from, and modifications of, the invention are recognized to be possible. Several of these are mentioned specifically below.

All of the special features and advantages mentioned above that are offered by the present invention will become more fully apparent as the description which now follows is read in conjunction with the accompanying drawings.

DETAILED DESCRIPTION OF, AND BEST MODE FOR CARRYING OUT, THE INVENTION

Figure 1:
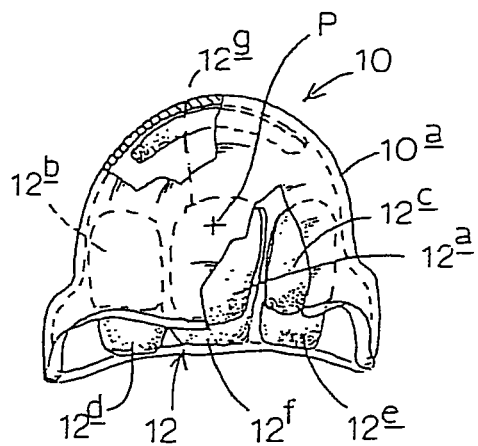
FIG. 1 is a front elevation (with certain portions broken away to reveal details of internal construction) of a military helmet which is equipped with plural pad-like expanses (seven in total number) of layered cushioning interface structure constructed in accordance with one preferred embodiment of the present invention.
Figure 2:
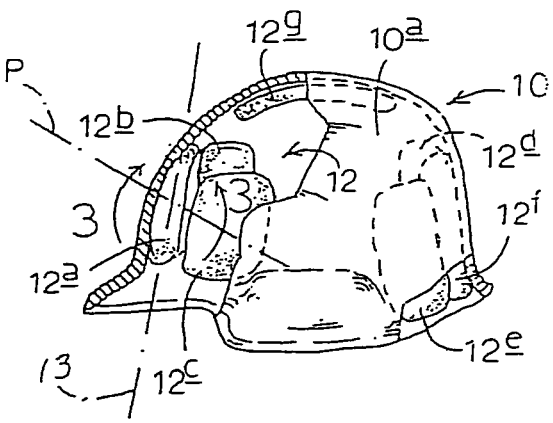
FIG. 2 is a side elevation (also with portions broken away to reveal internal construction) of the helmet of FIG. 1, on about the same scale as and taken generally from the right side of FIG. 1, and tilted slightly toward the viewer.
Figure 3:
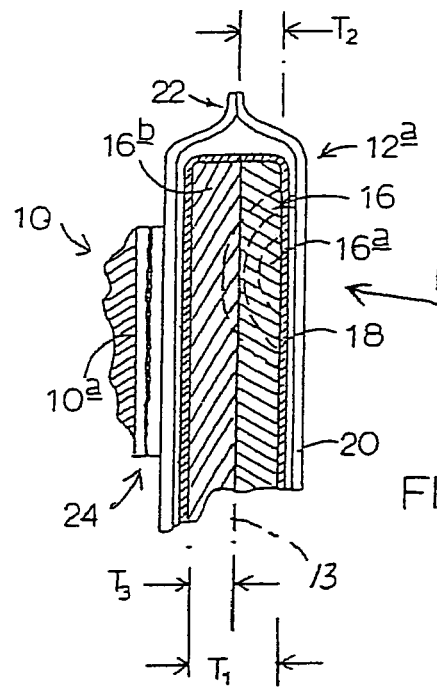
FIG. 3 is an enlarged-scale fragmentary detail taken generally in the area of curved arrows 3-3 in FIG. 2, showing in cross section one of the interface structures employed in the helmet of FIGS. 1 and 2.

Turning attention now to FIGS. 1, 2 and 3, indicated generally at 10 (FIGS. 1 and 2) is a military helmet including a shell 10a. In all respects, shell 10a is completely conventional in construction, and might have any one of a number of different specific constructions and configurations. Fastened in a manner that will shortly be described on the inside, concave, dome-like wall of shell 10a is an installation 12 of body-contacting interface structure constructed in accordance with the present invention. Installation 12, in the particular setting illustrated in these figures and now being described, includes seven, individual, multi-layer, cushioning, interface-structure pads 12a, 12b, 12c, 12d, 12e, 12f, 12g, each of which is constructed with one preferred form of a layered-assembly organization proposed by the present invention. Each such pad is also referred to herein as a body-contacting, expanse-like cushioning structure. Pad 12a is joined to the inside wall of shell 10a in the frontal, central portion of that wall, pads 12b, 12c on laterally opposite sides of pad 12a, pads 12d, 12e in laterally spaced locations on the inside, lower, rear portion of the inside wall of shell 10a, pad 12f centrally between pads 12d, 12e, and pad 12g on the upper (or crown) portion of the inside wall of shell 10a.

The perimetral shapes and the locations of these six pads, and indeed the specific number of pads chosen for use in helmet 10, are completely matters of choice, and form no part of the present invention. These specific shapes, locations, and this number, have been chosen in relation to equipping helmet 10 with an appropriate body-contacting interface structure that acts between a wearers head and shell 10a. A description of pad 12a which now follows, with regard to the layered construction (or assembly) of the pad, fully describes the construction of each of the other six pads in installation 12. It is useful to lead into this discussion by first explaining generally the different orientations of pad 12a that appear in FIGS. 2 and 3. Pad 12a, as shown in FIG. 2, has a somewhat planar configuration, and appears to lie generally in a plane 13 (shown in dash-dot lines) which slopes upwardly and to the right in FIG. 2. In FIG. 3, plane 13 is rotated counterclockwise to be vertical.

Accordingly, and focusing attention now on FIG. 3 along with FIGS. 1 and 2, pad 12a includes a cushion-like structure, or layer, 16 made up of two cushion-like sublayers 16a, 16b, a moisture (water)-blocking barrier layer 18, and a moisture-wicking outer layer 20. In the specific construction now being described, structure 16 effectively takes the form of a core structure, and is so also referred to in the context of describing and talking about the pads in installation 12. Layer 18 fully envelops core structure 16, and similarly, layer 20 fully envelops the combination of core structure 16 and layer 18. The assembly including structure, or core structure, 16 and layers 18, 20 is referred to herein as a layered assembly. The right side of pad 12a in FIG. 3 is referred to herein as the body-facing side, and the left side of the pad in this figure as the load-facing side. The right side of core structure 16 is also referred to herein as its body-facing expanse, and the left side of this core structure as its load-facing expanse.

Each of the two sublayers (16a, 16b) which make up core structure 16 is formed of a suitable acceleration-rate-sensitive material, such as a viscoelastic urethane material, which possesses, in technical terms known to those skilled in art, (a) acceleration-rate sensitivity, (b) temperature sensitivity and (c) pressure sensitivity. With regard to acceleration-rate sensitivity, the materials in sublayers 16a, 16b respond to compressive accelerations each with a resistance behavior that is likenable generally to the sheer-resistance behavior which is observed in certain fluids as a phenomenon known as fluid dilatancy. When compressive pressure is applied to these viscoelastic materials, if that pressure application is done at a very low acceleration rate, the materials respond very readily and fairly instantaneously with a yielding response. However, if such a pressure is applied rapidly, i.e., with a rapid acceleration rate, the materials tend to act very much like solids, and they do not respond rapidly with a yielding action. Generally speaking, the higher the rate of acceleration associated with an applied compressing force, the more like a solid material do sublayers 16a, 16b perform. An important consequence of this acceleration response characteristic is that the structure of the invention offers, in relation to prior art structures, a superior shock-cushioning action. It thus offers a significant improvement in injury avoidance. A contributing factor also in this regard is that the materials in sublayers 16a, 16b, after undergoing a compressive deformation, return relatively slowly toward their pre-deformation configurations.

While there are, and may be, various appropriate rate-sensitive materials that are employable, the description which follows herein is written in terms of viscoelastic material which performs very admirably.

The preferred two-sublayer make-up for core structure 16 is further characterized by the fact that the rate-sensitive, viscoelastic material in sublayer 16a has a lower durometer and Indentation Load Deflection (ILD) response number than does the material in sublayer 16b. Specifically, and in the construction now being described, sublayer 16a has a durometer with an ILD number (or rating) preferably in the range of about 15 to about 28, and sublayer 16b a durometer with an ILD rating preferably in the range of about 42 to about 55. Sublayer 16a herein is made of a viscoelastic material designated as Confor CF-40, made by a company called EAR Specialty Composites in Indianapolis, Ind. Sublayer 16b is made of a viscoelastic material designated as Confor CF-45, also made by this same company.

The overall thickness of core structure 16, i.e. the dimension thereof measured laterally (or from left to right sides) in FIG. 3 (shown at $T_1$), is about ⅞-inches. Sublayer 16a has a thickness pictured in FIG. 3 at $T_2$ (measured in the same fashion) of about ⅜-inches, and sublayer 16b, a thickness pictured in FIG. 3 at $T_3$ of about ½-inches. Sublayers 16a, 16b are joined to one another by means of a suitable adhesive material.

Within the context of a two-sublayer make-up for core structure 16, and with respect to an overall core structure thickness which is greater than about ½-inches, it is preferable that the thickness of sublayer 16a be maintained at no less than about ⅜-inches. Where the overall thickness of core structure 16 is reduced to about ½-inches or less, it is preferable here that this core structure be made of but a single layer of "lower durometer type" viscoelastic material.

Under all circumstances, it is preferable, where a multi-sublayer structure is employed for core structure 16, that the component thereof which is toward the body-facing side of the whole assembly have the lowest (in the case of more than two layers) durometer number associated with it.

Another consideration regarding the structure of core structure 16 is that, preferably, it have a quite uniform thickness throughout. Uniformity of thickness plays an important role in maximizing the capability of this core structure to conform as precisely as possible with, in the case of a helmet, the topography of the wearer's head. Our practice has been to create such a core structure with an overall thickness which lies within a tolerance range of about ±0.002-inches. This is the thickness tolerance which characterizes the core structure pictured in helmet 10.

Within the three-dimensional body of each of the two viscoelastic sublayers, there is no other structure present, save ambient and entrained gas. Accordingly, each such body responds substantially uniformly, and omnidirectionally, throughout its entirety.

Barrier layer 18 which completely surrounds, encapsulates and envelops core structure 16 in pad 12a, in a preferred embodiment of the invention, is a sprayed-on layer formed of a vinyl-solvent-based material known as Russell Coating, and sold under the product designator V-2000 to identify this product. It is made by Russell Products Company, Inc. at 275 N. Forge Street, Akron, Ohio 44304. In general terms, this coating product forms a smooth abrasion-resistant skin-like protective layer over the outside surfaces of core structure 16. It provides a breathable and durable membrane skin on the outside of the core structure, which membrane, despite its gas breathability which permits relatively free bidirectional gas flow into and out of the core structure, nonetheless possesses no through-passage which can permit the through-flow of water to its inside. It thus completely blocks the unwanted penetration (flow) of water into the core structure, while simultaneously allowing "breathing" of core structure 16 under circumstances of compression and return-from-compression.

In general terms, the coating product forms a smooth abrasion-resistant skin-like protective layer over the outside surfaces of core structure 16. It provides a breathable and durable membrane skin on the outside of the core structure which completely blocks penetration of moisture into the core structure, yet permits relatively free bidirectional gas flow into and out of the core structure. Thus, it permits "breathing" of core structure 16 under circumstances of compression and return-from-compression. In the specific setting of the military helmet now being described for illustration purposes, full "jacketing" of the core cushioning structure by the barrier layer enables the helmet be fully immersible in water without experiencing any degradation in cushioning-material performance, which degradation would result from any moisture entrance into the rate-sensitive core material.

Preferably, this barrier layer, in its sprayed-on configuration, has a thickness somewhere in the range of about 0.007-inches to about 0.01-inches, and in the specific construction now being described, has a thickness of about 0.009-inches. In the specific setting of the military helmet now being described for illustration purposes, jacketing, or containing, of the core cushioning structure by the barrier layer enables the helmet be fully immersible in water without experiencing any degradation in cushioning-material performance, which degradation would result from any moisture entrance into the rate-sensitive core material. As mentioned above in the Background and Summary of the Invention, barrier layer, or structure, 18 may take the form of any suitable moisture-barriering enclosure or container, not necessarily sprayed onto the core structure.

Jacketing the outside of the combined assembly of core structure 16 and barrier layer 18 is moisture-wicking layer 20. This layer, which can be treated as optional in certain applications, is distributed somewhat in the form of an enclosure bag around the core structure and barrier layer. In the construction now being described, layer 20 takes the form of a polyester fabric (with a nominal thickness of about 0.015-inches) known as Orthowick, made by Velcro Laminates, Inc., 54835 C.R. 19, Bristol, Ind. 46507. Specifically, this Orthowick material bears the following product designator: VELCRO® brand Loop 3993. The bag form of layer 20 is closed as by stitching generally where appropriate, and such stitching exists, for example, in the area shown at 22 in FIG. 3. As can be seen, this stitching does not penetrate the barrier layer.

Pad 12a is anchored to the inside of helmet shell 10a through a two-component conventional hook-and-pile structure 24 typically sold under the name Velcro—a readily commercially available product made by Velcro USA, Inc., 406 Brown Avenue, Manchester, N.H. 03108-4806. One component of this hook-and-pile structure is suitably joined as by stitching or adhesive bonding to the outside surface of layer 20 which is the surface that is on what was referred to earlier as the load-facing side of pad 12a. The other component of the hook-and-pile structure is suitably joined to the surface (at the appropriate location) of the inside wall in helmet shell 10a.

Figure 4:
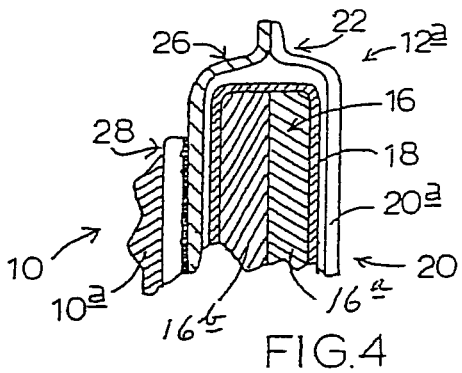
FIG. 4 is a fragmentary cross-sectional detail which is very much like the view presented in FIG. 3, showing one modified form of the structure of the present invention.

Turning attention now for a moment to FIG. 4, here there is indicated, also designated 12a, a modified form of a pad usable in helmet 10 at the location of previously described pad 12a. In this FIG. 4 pad 12a substantially all components therein are just as described in pad 12a as pictured in FIG. 3, except that the moisture-wicking layer 20 here takes one optional, modified form, essentially, of a single expanse of material 20a which extends only on and across what has been referred to previously as the body-facing side of pad 12a. Completing, with expanse 20a, an enclosure generally in a bag form around the assembly of core structure 16 and barrier layer 18 is another expanse of material 26. Material 26 has a direct compatibility with one of the two conventional components found in available hook-and-pile fastening structure, such as previously-described structure 24. For example, this material (26) might typically have compatibility with the so-called "hook portion" of a hook-and-pile fastener material. In FIG. 4, such a "hook portion" is shown at 28 suitably secured to the inside wall of helmet shell 10a. An appropriate fabric which is suitable for material expanse 26 is a material sold as Veltex—another readily commercially available product made by Velcro USA, Inc. The Veltex product specifically employed in pad 12a herein bears the product designator: VELCRO® brand Loop 3981.

Figure 5:
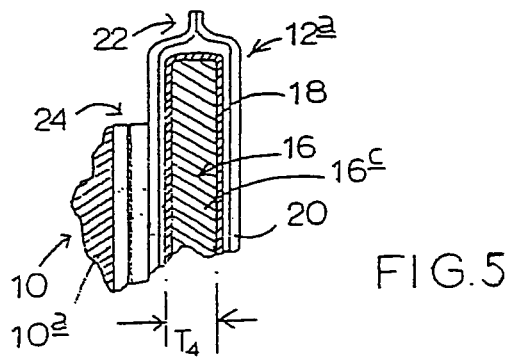
FIG. 5 is a view which is very much like those presented in FIGS. 3 and 4, showing yet another modified form of the invention.

FIG. 5 in the drawings illustrates yet another modified form of a pad 12a made in accordance with the invention. This FIG. 5 pad 12a differs from pad 12a as shown in FIG. 3 by the fact that core structure 16 here includes but a single, acceleration-rate-sensitive, viscoelastic component, or sub-layer element, shown at 16c. Component 16c has a thickness, indicated at $T_4$ in FIG. 5, of about ½-inches, and is formed generally of the same kind of viscoelastic material described earlier as having a durometer rating with an ILD number in the range of about 15 to about 28. Thus, component 16c herein is made of the EAR Specialty Composites material designated as Confor CF-40.

A factor to note now in relation to the several structural embodiments that have been illustrated and described so far with regard to the present invention is that, fundamentally, the features of the invention which offer the advantages ascribed to it are furnished by the presence of certain cooperating layers of material. These layers, in a preferred form of the invention, include a moisture-wicking body-contacting layer, a moisture-blocking barrier layer, and a cushioning layer which is formed preferably of a rate-sensitive material, such as a viscoelastic material, that offers the qualities of temperature sensitivity, pressure sensitivity and acceleration-rate sensitivity described above for structure 16. And, while such a three-layer organization is generally preferred, and as was mentioned above, the moisture-wicking layer can be omitted in certain applications.

Thus, there is provided by the present invention a unique, layered, body-contacting, cushioning structure which offers the various benefits ascribed to it hereinabove—which benefits offer significant improvements over related prior art structures. When the structure of the present invention engages the human body, such as the head of a wearer of a helmet like that shown and described with respect to FIGS. 1-5, inclusive, initial contact areas with the head which may define raised or elevated pressure points are reacted to by behavior in core structure 16 in a manner which causes these pressure points to disappear, and to yield to a relatively even overall contact pressure regarding the head. For example, such a pressure point is generally shown in FIG. 1 by the cross which is designated P, a pressure point which can be thought of as acting along a line of action shown by the dash-dot line shown at P in FIG. 2, and by the arrow P in FIG. 3.

Such an initial pressure point might also be characterized as a warm spot that has a somewhat elevated regional temperature because of close, higher-pressure contact with the skin of the head, for example. This condition, along with the elevated local pressure condition just mentioned, will cause core structure 16 to begin to adjust by lateral flow or creep, somewhat as is illustrated by the three curved dashed lines present in FIG. 3. This effectively causes the structure of the invention to retreat from exerting localized elevated-pressure contact with the head, thus to eliminate a differentiating high-pressure point, and accordingly to conform to head topography in a way that avoids capillary circulation-loss discomfort. This specific behavior is exactly what makes the structure of the invention so useful in the settings of wound dressings.

Evenizing and "delocalizing" of static contact pressure because of the kind of action just described reduces substantially to non-existence the likelihood of a wearer of a helmet, like helmet 10, experiencing the kind of pain and discomfort described earlier herein. Contact of the head directly with a moisture-wicking layer, such as layer 20, is effective preferably to rid perspiration readily and quickly from the head, and in the process, to promote enhanced evaporative cooling. The presence of barrier layer 18 assures that wicked-away and ridden moisture, as well as any water-immersion moisture, does not enter the rate-sensitive, viscoelastic cushioning material(s) to interfere with the cushioning performance of structure 16.

Beyond the somewhat static conditions just described which make the wearing of a helmet like helmet 10 far more comfortable than the wearing of a conventional helmet (with a conventional head support structure), if and when a shock load is transmitted through the helmet to the head of the wearer, the rate-sensitive nature of structure 16 causes that structure to respond with the behavior described earlier herein to act in an acceleration-resistant fashion that causes such a shock load to be distributed over a very broad expanse, rather than over a very small localized region of the head. This behavior causes the structure of the present invention, therefore, to offer superior ballistic response capabilities in relation to the likelihood of a serious injury occurring for a given kind of impact or shock-load event.

While the invention has been disclosed in particular settings, and in particular forms herein, the specific embodiments disclosed, illustrated and described herein are not to be considered in a limiting sense. Numerous variations, some of which have been discussed, are possible. Applicants regard the subject matter of their invention to include all novel and non-obvious combinations and subcombinations of the various elements, features, functions and/or properties disclosed herein.

We claim:

1. A body-contacting interface structure comprising a core, viscoelastic, acceleration-rate-sensitive cushioning structure, formed of a compressible, non-springy, viscoelastic, urethane foam possessing a load-response behavior which (a) resists sudden-movement rapid compression, yet (b) is less resistive to slow-movement compression, wherein the urethane foam behavior is degraded when exposed to water-based moisture, and a moisture-barriering container surrounding and encapsulating said cushioning structure, operable to block the flow of all moisture from all regions outside said container to the inside thereof while accommodating bidirectional gas permeability of all non-water-based gases for the cushioning structure inside said container.

2. The interface structure of claim 1 which further comprises a moisture-wicking structure surrounding said container.

3. A body-contacting interface structure comprising a core, viscoelastic, acceleration-rate-sensitive cushioning structure, formed of a compressible, non-springy, viscoelastic, urethane foam possessing a load-response behavior which (a) resists sudden-movement rapid compression, yet (b) is less resistive to slow-movement compression, wherein the urethane foam behavior is degraded when exposed to water-based moisture, a moisture-barriering container surrounding and encapsulating said cushioning structure, operable to block the flow of all moisture from all regions outside said container to the inside thereof while accommodating bidirectional gas permeability of all non-water-based gases for the cushioning structure inside said container, and a moisture-wicking structure surrounding said container.

\* \* \* \* \*